United States Patent
Sugimoto et al.

(10) Patent No.: US 11,702,343 B2
(45) Date of Patent: Jul. 18, 2023

(54) DIAMOND PARTICLES, DIAMOND-CONTAINING COMPOSITION, AND METHOD FOR PRODUCING DIAMOND PARTICLES

(71) Applicant: SEKISUI CHEMICAL CO., LTD., Osaka (JP)

(72) Inventors: Masataka Sugimoto, Ebina (JP); Taku Sasaki, San Jose, CA (US); Abison Scaria, Takatsuki (JP); Hidehito Nishizawa, Baraki (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 15/733,986

(22) PCT Filed: Jun. 4, 2019

(86) PCT No.: PCT/JP2019/022178
§ 371 (c)(1),
(2) Date: Dec. 1, 2020

(87) PCT Pub. No.: WO2019/235478
PCT Pub. Date: Dec. 12, 2019

(65) Prior Publication Data
US 2021/0214233 A1    Jul. 15, 2021

(30) Foreign Application Priority Data

Jun. 4, 2018 (JP) .............. JP2018-107242
Sep. 7, 2018 (JP) .............. JP2018-168017

(51) Int. Cl.
*C01B 32/26* (2017.01)
*C08L 101/00* (2006.01)

(52) U.S. Cl.
CPC .......... *C01B 32/26* (2017.08); *C08L 101/00* (2013.01); *C01P 2004/61* (2013.01); *C01P 2004/62* (2013.01); *C01P 2006/32* (2013.01); *C01P 2006/40* (2013.01)

(58) Field of Classification Search
None
See application file for complete search history.

(56) References Cited

U.S. PATENT DOCUMENTS

| 2015/0315722 | A1* | 11/2015 | Nzama | ..................... B01J 3/062 51/307 |
| 2017/0287810 | A1  | 10/2017 | Morikawa et al. | |
| 2018/0009716 | A1* | 1/2018  | Easley | ............. C04B 35/62813 |

FOREIGN PATENT DOCUMENTS

| CN | 103966533      | 8/2014  |
| CN | 104854024      | 8/2015  |
| CN | 106688092      | 5/2017  |
| JP | 2002-30217     | 1/2002  |
| JP | 2004-238256    | 8/2004  |
| JP | 2011-201720    | 10/2011 |
| JP | 5323492        | 10/2013 |
| JP | 2016-155889    | 9/2016  |
| JP | 2017-95307     | 6/2017  |
| JP | 2017-214244    | 12/2017 |
| JP | 2018-150192    | 9/2018  |
| KR | 10-2017-0121188 | 11/2017 |
| WO | 2017/203763    | 11/2017 |

OTHER PUBLICATIONS

Office Action dated Apr. 28, 2021 in corresponding Chinese Patent Application No. 201980037012.2, with English Translation, 22 pages.
International Search Report (ISR) dated Jul. 30, 2019 in International (PCT) Application No. PCT/JP2019/022178.
Mitev et al., "Microwave-assisted purification of detonation nanodiamond", Diamond and Related Materials, 2014, vol. 48, pp. 37-46, 10 pages.
Rouhani et al., "Purification and functionalization of nanodiamond to serve as a platform for amoxicillin delivery", Materials Science and Engineering C, 2016, vol. 63, pp. 323-332, 10 pages.
Ushizawa et al., "Covalent immobilization of DNA on diamond and its verification by diffuse reflectance infrared spectroscopy", Chemical Physics Letters, 2002, vol. 351, No. 1-2, pp. 105-108, 4 pages.
Extended European Search Report dated Aug. 20, 2021 in corresponding European Patent Application No. 19 81 4808, 6 pages.

* cited by examiner

*Primary Examiner* — Ronak C Patel
(74) *Attorney, Agent, or Firm* — Wenderoth, Lind & Ponack, L.L.P.

(57) ABSTRACT

The diamond particle according to the present invention has an ionic conductivity Di represented by the following expression of 0.8 mS/m or lower:

$$Di = Ds - Dw$$

wherein Ds represents an ionic conductivity of an aqueous solution obtained by dissolving-out in a pressure cooker test carried out according to IEC68-2-66; and Dw represents an ionic conductivity of distilled water.

7 Claims, No Drawings

DIAMOND PARTICLES, DIAMOND-CONTAINING COMPOSITION, AND METHOD FOR PRODUCING DIAMOND PARTICLES

TECHNICAL FIELD

The present invention relates to a diamond particle and a diamond particle-containing composition, used, for example, for a heat-dissipating member, and a method for producing a diamond particle.

BACKGROUND ART

In electronic devices, integrated electronic components generate heat and cause failures, and hence heat-dissipating members to dissipate heat generated by the electronic components outside the devices are sometimes installed. The heat-dissipating members are arranged, for example, between electronic components and housings, heat sinks or the like. The heat-dissipating members are usually formed of resin compositions in which thermally conductive fillers are blended in resins or elastomers.

In recent years, along with size reduction and performance enhancement of electronic devices, there have been demanded technologies of efficiently dissipating heat generated accompanying driving, and further improvement of thermal conductivity for heat-dissipating members has been demanded. Then in the case where the heat-dissipating members have electric conduction, the heat-dissipating members, when contacting with unintended places or otherwise, cause abnormal action in some cases, and electric insulativity is demanded for the heat-dissipating members in some cases.

As shown in Patent Literature 1, a silicone resin composition having a silicone resin, diamond, zinc oxide and a dispersant is conventionally known. Since diamond has a higher thermal conductivity than alumina, magnesium oxide, boron nitride and the like usually used as thermally conductive fillers, the silicone resin composition of Patent Literature 1 becomes good in the heat dissipativity. Further, diamond is low in the electric conductivity and makes it easy to impart electric insulativity to heat-dissipating members. In Patent Literature 1, the silicone resin used is silicone oil and silicone gel.

CITATION LIST

Patent Literature

PTL1: JP 2002-30217 A

SUMMARY OF INVENTION

Technical Problem

In a heat-dissipating member, from the viewpoint of making the handleability good, it is desirable to cure a composition for forming the heat-dissipating member. For example, as seen in Patent Literature 1, however, if curing of a composition containing diamond (diamond-containing composition) is tried using a silicone resin made to be of an addition reaction type or the like, curability lowers and such a disadvantage is caused that the composition is not fully cured. When the diamond-containing composition is not fully cured, such disadvantages are caused in some cases that the composition causes liquid sagging or the like and contaminates electronic devices, and cannot hold heat-dissipating members in fixed shapes. Further when the diamond-containing composition is stored for a long term, its polymer matrix is deteriorated and the curability is lowered in some cases.

Then, an object of the present invention is to provide a diamond particle allowing a diamond-containing composition to be suitably cured, and a diamond-containing composition.

Solution to Problem

As a result of studies on the factor of lowering the curability of a diamond-containing composition comprising a diamond particle and a polymer matrix, the present inventors have made clear that ionic impurities adhered on the diamond particle inhibit the curing and deteriorate the polymer matrix. Then it has been found that by reducing the amount of the ionic impurities, the above problem can be solved, and this finding has led to the completion of the following present invention. That is, the present invention provides the following [1] to [11].

[1] A diamond particle, having an ionic conductivity Di represented by the following expression of 0.8 mS/m or lower:

$$Di = Ds - Dw$$

wherein Ds represents an ionic conductivity of an aqueous solution obtained by dissolving-out in a pressure cooker test carried out according to IEC68-2-66; and Dw represents an ionic conductivity of distilled water.

[2] A method for producing a diamond particle, comprising a step of cleaning a raw material diamond particle with a polar solvent.

[3] The method for producing a diamond particle according to the above [2], wherein the polar solvent is at least one of alcohols and water.

[4] The method for producing a diamond particle according to the above [2], wherein the polar solvent is water at 50° C. or higher.

[5] The method for producing a diamond particle according to any one of the above [2] to [4], comprising a step of cleaning a raw material diamond particle with a liquid containing an organic acid having 2 to 6 carbon atoms in a molecule thereof and the polar solvent.

[6] A diamond-containing composition, comprising a diamond particle according to the above [1] and a polymer matrix.

[7] A diamond-containing composition comprising a diamond particle and a polymer matrix, the diamond-containing composition having:

a change ratio in the curing starting time represented by $((A2-A1)/(A4-A1)) \times 100$ of 50% or higher, wherein A2 represents a complex elastic modulus of the diamond-containing composition after 5 min when the diamond-containing composition is heated and cured at 70° C.; A4 represents a complex elastic modulus thereof after 30 min when the diamond-containing composition is heated and cured at 70° C.; and A1 represents a complex elastic modulus thereof at the 70° C.-heating starting time.

[8] The diamond-containing composition according to the above [6] or [7], wherein the diamond-containing composition has a packing fraction of the diamond particle of 10% by volume or higher and 90% by volume or lower.

[9] A diamond particle, having a content of either of a chromium element and an iron element of 0.5% by ppm or lower.

[10] A diamond-containing composition comprising a diamond particle according to the above [9] and a polymer matrix.

[11] The diamond-containing composition according to the above [10], wherein the diamond-containing composition has a packing fraction of the diamond particle of 10% by volume or higher and 90% by volume or lower.

Advantageous Effects of Invention

The present invention can provide a diamond particle allowing the curability of a diamond-containing composition to be made good, and a diamond-containing composition.

DESCRIPTION OF EMBODIMENTS

Hereinafter, the present invention will be described by using embodiments.

[Diamond Particle]

The diamond particle according to the present invention is one having an ionic conductivity Di represented by the following expression of 0.8 mS/m or lower:

$$Di = Ds - Dw$$

wherein Ds represents an ionic conductivity of an aqueous solution obtained by dissolving-out in a PCT carried out according to IEC68-2-66; and Dw represents an ionic conductivity of distilled water.

The PCT is an abbreviation for a pressure cooker test; and by making the diamond particle to be exposed to a high temperature high humidity environment in the PCT, ionic impurities adhered on the surface of the diamond particle are almost all removed from the particle and dissolved out in an aqueous solution. Therefore, by measuring the ionic conductivity Di described above, there can be detected the amount of ionic impurities adhered on the surface of the diamond particle.

In the present invention, when the ionic conductivity Di exceeds 0.8 mS/m, the amount of the ionic impurities adhered on the surface of the diamond particle becomes large and it becomes difficult for the diamond-containing composition comprising the diamond particle and the polymer matrix to be cured. Hence, it becomes difficult for the curing rate of the diamond-containing composition to be made high. Further due to the ionic impurities adhered on the surface of the diamond particle, there arises such risk that the polymer matrix is deteriorated and the curability after a long-term storage is lowered.

The ionic conductivity Di of the diamond particle is preferably 0.7 mS/m or lower, more preferably 0.55 mS/m or lower and still more preferably 0.52 mS/m or lower. When the ionic conductivity Di is made to be not higher than these lower limit values, the curability of the diamond-containing composition becomes excellent, enabling the curing rate to be made sufficiently high. Further also after a long-term storage, the diamond-containing composition becomes enabled to be suitably cured and also the curability after the long-term storage becomes good.

Although the lower the ionic conductivity Di of the diamond particle, the better, from the viewpoint of preventing more reduction than needed of the amount of impurities and improving the productivity, the ionic conductivity Di is preferably 0.05 mS/m or higher, more preferably 0.10 mS/m or higher and still more preferably 0.15 mS/m or higher.

The diamond particle of the present invention is typically synthetic diamond. The synthetic diamond usually has components, originated from compounds such as a metal catalyst and an acid component used in the producing process thereof, adhered as ionic impurities in trace amounts on the surface of a diamond particle (raw material diamond particle). In the present invention, by removing the ionic impurities adhered in trace amounts on the raw material diamond particle by a cleaning step described later, the ionic conductivity Di of the diamond particle can be lowered as described above.

The impurities adhered on the surface of the raw material diamond particle are not especially limited, but are, for example, compounds containing at least one of a metal atom, a sulfur atom, a phosphorus atom, a silicon atom, a halogen atom, a nitrogen atom and the like.

Among these, the metal atom often inhibits the curing reaction; for example, in the case of an addition reaction-type silicone resin, and in the case where the diamond-containing composition is cured with a curing catalyst such as a platinum-based catalyst, the metal atom inactivates the curing catalyst and makes it difficult for the diamond-containing composition to be cured. The metal atom is adhered, for example, in the state of being a metal salt, on the surface of the diamond particle. Then the metal atom is usually originated from a metal catalyst used in diamond producing, and specific examples thereof include iron and chromium.

Then, the sulfur atom is adhered in the state of being a salt such as a sulfate salt on the surface of the diamond particle. The sulfur atom is originated, for example, from an acid used for acid cleaning. Impurities containing a sulfur atom such as a sulfate salt often deteriorate the polymer matrix, and cleave, for example, a silicone compound and reduce its molecular weight in some cases.

In the present invention, even if impurities adhered on the surface of the diamond particle contain a metal atom liable to inhibit the curing reaction and a sulfur atom liable to deteriorate the polymer matrix, by making the ionic conductivity Di to be not higher than the predetermined value as described above, contents of these atoms also become low. Hence, the deterioration of the polymer matrix is prevented, and further, the curing reaction is made to suitably progress, enabling the curing rate to be made high also.

The impurities adhered on the surface of the diamond particle include ones derived from an iron atom and an chromium atom, as described above; and these are liable to deteriorate the polymer matrix. Therefore, another aspect of the present invention has such one feature that in the diamond particle, the contents of impurities are reduced.

Specifically, it is preferable that either content of a chromium element and an iron element in the diamond particle is made to be 0.5 ppm by mass or lower. The either content is preferably 0.3 ppm by mass or lower and more preferably 0.2 ppm by mass or lower. When either content of a chromium element and an iron element is not higher than these upper limit values, the deterioration of the polymer matrix is suitably prevented. Further the curing reaction is made to suitably progress without being inhibited, enabling the curing rate to be made high also.

Although the lower the either content of a chromium element and an iron element in the diamond particle, the better, from the viewpoint of preventing more reduction than needed of the either content and improving the productivity, the either content is preferably 0.001 ppm by mass or higher and more preferably 0.01 ppm by mass or higher. Here, it is presumed that the chromium element and the iron element are adhered on the diamond particle, for example, as chromium sulfate ($CrSO_4$) and iron sulfate ($FeSO_4$), and these are liable to deteriorate particularly the curing reaction.

(Spheroidicity)

In the diamond particle of the present invention, its spheroidicity is, for example, 0.5 or higher, preferably 0.55 or higher and more preferably 0.6 or higher. The spheroidicity is an index indicating being closer to a sphere the nearer the spheroidicity is to 1; and when the spheroidicity is made high, it becomes easy for the diamond particle to be dispersed in the polymer matrix, and further it becomes easy also for the packing fraction to be raised. The upper limit of the spheroidicity is not especially limited, and is 1.

The spheroidicity of the diamond particle can be calculated by examining an electron microscope photograph and calculating (the diameter of a circle whose area is equivalent to a projected area of a particle/the diameter of the smallest circle circumscribing a projected image of the particle).

Then since the diamond particle is usually used in a plural number, the spheroidicity means an average value of the diamond particle in a plural number. The average value of the diamond particle may be an average value of sphericities of 300 particles as measured in the above, but in the case where the diamond particle does not have 300 particles, the average value means an average value of all the particles of the diamond particle.

The specific shape of the diamond particle is not especially limited, and may be, for example, globular, a crushed shape or another shape. Being globular means being spherical or a shape approximating to a sphere; and in the present description, a shape having a spheroidicity of 0.8 or higher is defined as being globular. Further, the crushed shape refers to a shape micronized by crushing, and usually has an angular shape. The crushed shape has, for example, a spheroidicity of 0.5 or higher and lower than 0.8, and preferably a spheroidicity of 0.55 or higher and lower than 0.8 and more preferably a spheroidicity of 0.6 or higher and lower than 0.8. When the diamond particle is made to have a globular or crushed shape, it becomes easy for the packing fraction of the diamond particle to be raised in the diamond particle-containing composition and particularly when it has a globular shape, it becomes easier for the packing fraction to be raised.

(Particle Diameter)

The particle diameter of the diamond particle is, for example, 0.1 µm or larger and 250 µm or smaller. By making the particle diameter of the diamond particle to be 0.1 µm or larger, it becomes easy for the thermal conduction of the diamond-containing composition described later to be raised. Further by making that to be 250 µm or smaller, the diamond particle is enabled to be suitably dispersed in the polymer matrix and to be blended in a high packing fraction in the diamond-containing composition. From these viewpoints, the particle diameter of the diamond particle is preferably 0.5 µm or larger and 200 µm or smaller, more preferably 1 µm or larger and 150 µm or smaller and still more preferably 10 µm or larger and 100 µm or smaller.

Since the diamond particle is usually used in a plural number, the above particle diameter means an average value (average particle diameter) of the diamond particle in a plural number. The average particle diameter is an average particle diameter obtained by averaging particle diameters in terms of volume, and can be measured, for example, by using a "laser diffraction-type particle size distribution analyzer", manufactured by Horiba, Ltd. With respect to the calculation method of the average particle diameter, a particle diameter (d50) when the cumulative volume is 50% may be defined as the average particle diameter.

In the present invention, the diamond particle contained in the diamond-containing composition may comprise two or more types of diamond having different average particle diameters from each other. When two or more types of diamond having different average particle diameters are used, particles having smaller average particle diameters of the diamond particle get into between particles having larger average particle diameters of the diamond particle, making it easy that the diamond particle is suitably dispersed in the polymer matrix and simultaneously the packing fraction of the diamond particle is raised. Here, the diamond-containing composition can be judged to have two or more types of diamond having different average particle diameters by the fact that in a particle size distribution of the diamond particle, two or more peaks emerge. This applies similarly to other thermally conductive fillers and the like described later.

In the case of containing two or more types of diamond having different average particle diameters, it is preferable that the diamond particle is, for example, a mixture of a diamond having an average particle diameter of 10 µm or larger and 250 µm or smaller (hereinafter, referred to also as "large particle diameter diamond") and a diamond having an average particle diameter of 0.1 µm or larger and smaller than 10 µm (hereinafter, referred to also as "small particle diameter diamond").

In the case where the diamond particle contains both of the small particle diameter diamond and the large particle diameter diamond, the volume ratio (large particle diameter/small particle diameter) of the large particle diameter diamond to the small particle diameter diamond is, for example, 0.1 or higher and 10 or lower, preferably 0.2 or higher and 8 or lower and more preferably 0.3 or higher and 6 or lower.

In the large particle diameter diamond, the average particle diameter is more preferably 15 µm or larger and 200 µm or smaller and still more preferably 18 µm or larger and 150 µm or smaller.

For the large particle diameter diamond, there may further be used concurrently two types of diamond having different average particle diameters from each other.

In the small particle diameter diamond, the average particle diameter is more preferably 0.2 µm or larger and 8 µm or smaller and still more preferably 0.5 µm or larger and 7 µm or smaller. For the small particle diameter diamond, there may further be used concurrently two types of diamond having different average particle diameters from each other.

In the case where two or more types of the diamond particle having different average particle diameters are contained, the diamond particle does not need to contain both of the small particle diameter diamond and the large particle diameter diamond, and may contain, for example, two or more types of only the small particle diameter diamond having different average particle diameters, or two or more types of only the large particle diameter diamond having different average particle diameters.

Two or more types of the diamond particle having different average particle diameters may have the same spheroidicity or different sphericities from each other, but it is preferable that the sphericities are all within the above range.

The diamond particle of the present invention may be surface-treated as long as the above ionic conductivity Di and amount of impurities, and the like are within the above predetermined ranges. When the diamond particle is surface-treated, it becomes easy for the diamond particle to conform to the polymer matrix and it becomes easy for a large amount of the diamond particle to be made to be homogeneously dispersed in the polymer matrix.

The diamond particle is surface-treated with a surface treating agent such as a silane compound, an organotitanium compound, an organoaluminum compound or a phosphate compound, or the like, and preferably surface-treated with the silane compound. Examples of the silane compound include well-known silane coupling agents.

[Method for Producing the Diamond Particle]

The diamond particle according to the present invention can be produced, for example, by producing methods of the following first and second embodiments.

A method for producing the diamond particle according to the first embodiment of the present invention comprises a cleaning step of cleaning a diamond particle (hereinafter, referred to also as "raw material diamond particle") usually available, with a polar solvent.

In the present invention, by carrying out such a cleaning step, the amount of various ionic impurities adhered on the surface of the diamond particle can be reduced, and the ionic conductivity Di can be lowered as described above. The contents of various impurities having, for example, a chromium atom and an iron atom can also be made to be not higher than the predetermined values as described above.

Then, a method for producing the diamond particle according to the second embodiment of the present invention comprises a step of cleaning a raw material diamond particle with a cleaning liquid of a polar solvent having a cleaning agent added thereto.

In the present invention, also when the diamond particle is produced by the producing method comprising such a cleaning step, the amounts of various ionic impurities adhered on the surface of the diamond particle can be reduced, and the ionic conductivity Di can also be lowered as described above. The contents of various impurities having, for example, a chromium atom and an iron atom can also be made to be not higher than the predetermined values as described above.

The cleaning liquid used in the second embodiment is one containing a cleaning agent and a polar solvent, and is obtained by adding the cleaning agent to the polar solvent in well-known means. Examples of the cleaning agent include organic acids and inorganic bases.

Examples of the organic acids include organic acids having 2 to 6 carbon atoms in their molecule, such as acetic acid, citric acid, malonic acid, maleic acid, fumaric acid, oxalic acid, propionic acid, lactic acid, malic acid, tartaric acid, succinic acid and glycolic acid. Examples of the inorganic bases include alkaline metal bases such as sodium hydroxide and potassium hydroxide. By using these cleaning agents, ionic impurities adhered on the surface of the diamond particle can effectively be removed.

Among the above cleaning agents, preferable are organic acids having 2 to 6 carbon atoms in their molecule; more preferable are acetic acid and citric acid; and especially preferable is citric acid. By using the organic acid, without adhesion of ionic impurities originated from the cleaning agent on the surface of the diamond particle, there can effectively be removed the ionic impurities adhered on the surface of the diamond particle.

The cleaning liquid to be used in the second embodiment, by addition of a cleaning agent to a polar solvent such as water, depending on the kind of the cleaning agent, turns acidic or alkaline. For example, by addition of an acidic cleaning agent such as an organic acid, the cleaning liquid turns acidic, and a specific pH of the cleaning liquid is, for example, 1 or higher and 5.5 or lower, and preferably 1.5 or higher and 5 or lower.

The cleaning liquid to be used in the second embodiment turns acidic by addition of a basic cleaning agent such as an inorganic base, and a specific pH of the cleaning liquid is, for example, 9 or higher and 13 or lower, and preferably 10 or higher and 12 or lower.

The concentration of the cleaning agent in the cleaning liquid is not especially limited, but may be, for example, 0.1 mmol/L or higher and 1 mol/L or lower and preferably 0.5 mmol or higher and 500 mmol/L or lower.

(Raw Material Diamond Particle)

Examples of the raw material diamond particle to be used in the producing methods according to the first and second embodiments include synthetic diamond produced by a conventionally well-known method. The producing method thereof is not especially limited, but the synthetic diamond can be synthesized by crystallizing a carbon raw material such as graphite in the presence of a metal catalyst of iron, chromium or the like in a high temperature and high pressure. A diamond particle thus synthesized is subjected to acid cleaning or the like in order to remove the graphite, the metal catalyst and the like as impurities. Hence, as described above, components originated from the metal catalyst, components originated from the acid, and the like in trace amounts are adhered on the surface of the diamond particle as ionic impurities.

The raw material diamond particle may be a commercially available product. Examples of the commercially available product include TMS Series, AGD Series, CMM Series, MD Series and IMS Series, manufactured by Tomei Diamond Co., Ltd., and MB Grade, MBP Grade, MBP2 Grade, MBMC Grade, MBA Grade, MBE Grade and MRB Grade, manufactured by Saint Gobain Co., Ltd. Examples of the product further include GMM Diamond and MBG Diamond, manufactured by Hyperion Materials & Technologies Inc., MDA manufactured by Element Six (UK) Ltd., and IMPM manufactured by Iljin Diamond Co., Ltd.

(Polar Solvent)

A solvent to be used in the first and second embodiments according to the present invention is a polar solvent. If the solvent is not a polar solvent, in the first embodiment, ionic impurities adhered on the surface of the diamond particle cannot sufficiently be removed and it becomes difficult for the ionic conductivity Di to be regulated in the above range, in some cases.

Further if pH becomes low, ionic components are much contained in the polar solvent and adhered on the surface of the diamond particle, making also a cause of raising the ionic conductivity Di, in some cases. From the viewpoint of making less the ionic components in the polar solvent, it is preferable that the polar solvent has a property of being neutral or nearly neutral, and specifically, the pH of the polar solvent is preferably 5 or higher, and preferably 5.5 or higher and 9 or lower, more preferably 6 or higher and 8 or lower, still more preferably 6.5 or higher and 7.5 or lower, and most preferably 6.8 or higher and 7.2 or lower.

Here, the pH of the polar solvent can be measured by using an electronic pH meter.

Specific preferable examples of the polar solvent in the each embodiment include water and alcohols; and water is more preferable in order to make lower the ionic conductivity Di and the amount of impurities adhered on the surface of the diamond particle.

Examples of the alcohols include alcohols having 1 to 4 carbon atoms, and specific examples thereof include methanol, ethanol, n-propanol, isopropanol, n-butanol, 2-butanol, isobutyl alcohol, t-butyl alcohol and ethylene glycol. Among these, methanol and ethanol are preferable and ethanol is more preferable.

The water is not especially limited, but distilled water, ion-exchange water, pure water and the like can suitably be used, and city water, industrial water and the like may be used.

Further in the above each embodiment, it is preferable that the polar solvent substantially contains no ionic components. Therefore, the content of ionic components in the polar solvent is 100 ppm by mass or lower, and more preferably 0.1 ppm by mass or higher and 50 ppm by mass or lower. The content of ionic components can be measured by ion chromatography.

Cleaning with the polar solvent or the cleaning liquid in the above each embodiment is carried out, for example, by adding the diamond particle in the polar solvent or the cleaning liquid, stirring the polar solvent or the cleaning liquid containing the diamond particle, and thereafter separating the diamond particle from the polar solvent or the cleaning liquid. The stirring may be carried out, for example, by stirring using a vibratory mixer, a stirring impeller or the like. The separation of the diamond particle from the polar solvent or the cleaning liquid may be carried out by filtration, decantation or centrifugation, and among these, filtration is preferable.

After the finish of the cleaning with the polar solvent or the cleaning liquid, the diamond particle is suitably dried or otherwise to thereby remove the polar solvent adhered on the surface of the diamond particle.

The amount of the polar solvent or the cleaning liquid to be used is, with respect to the diamond particle, in terms of mass, preferably 1 time or more and 10 times or less, and more preferably 1.5 times or more and 8 times or less.

The temperature of the polar solvent or the cleaning liquid suffices if being not lower than the melting point of the polar solvent and not higher than the boiling point thereof, and is, for example, 5° C. or higher and 100° C. or lower. Then, the stirring time is, for example, 1 min or longer and 10 hours or shorter.

The above various conditions in the cleaning step can suitably be varied according to the kind of the polar solvent. For example, in the case where the polar solvent is water, it is preferable that the temperature of the polar solvent (that is, water) or the cleaning liquid in the cleaning step is made to be relatively high, and specifically, the temperature is preferably 50° C. or higher, more preferably 60° C. or higher, and still more preferably 65° C. or higher.

In the cleaning step, impurities adhered on the surface of the diamond particle are removed by making the impurities to dissolve out in the solvent, and washing the impurities off by stirring, and otherwise; but in the case of using water as the polar solvent, it is presumed that predominant is the removal of the impurities by dissolving-out in the solvent. Therefore, in the case of using water as the polar solvent, by raising the temperature of the polar solvent or the cleaning liquid to some degree as described above, the amount of impurities dissolving out in water is increased, thereby enabling the removing efficiency of the impurities by cleaning to be improved. Then as in the second embodiment, by using the cleaning liquid of the polar solvent having the cleaning agent added thereto, the removing efficiency of the impurities by cleaning is also enabled to be improved more.

Then in the case where the polar solvent is water, the temperature of the polar solvent or the cleaning liquid suffices as long as being 100° C. or lower, but is, from the viewpoint of the productivity, preferably 90° C. or lower, and more preferably 80° C. or lower. The stirring of the polar solvent or the cleaning liquid having the diamond particle added thereto may be carried out in the atmospheric pressure.

In the case where the polar solvent is water, from the viewpoint of increasing the amount of impurities dissolving out in water, the longer the stirring time, the better; and the stirring time is preferably 1.5 hours or longer, more preferably 2.5 hours or longer, and still more preferably 5 hours or longer. Further, from the viewpoint of the productivity, the shorter the stirring time, the better; and the stirring time is preferably 10 hours or shorter, and more preferably 8 hours or shorter.

In the case where the polar solvent is an alcohol, the temperature of the polar solvent or the cleaning liquid is not especially limited, and suffices as long as being 5° C. or higher and 100° C. or lower; and among these, the temperature is preferably 10° C. or higher and 50° C. or lower, and more preferably 15° C. or higher and 40° C. or lower. In the case of using the alcohol as the polar solvent, it is presumed that predominant is the removal of the impurities adhered on the surface of the diamond particle by washing off by the stirring. Hence, even if the temperature of the polar solvent or the cleaning liquid is made to be as relatively low as 50° C. or lower, the impurities can suitably be removed. Further by making the temperature of the polar solvent or the cleaning liquid in the above range, since there is almost no need of temperature regulation of the polar solvent or the cleaning liquid, the productivity becomes good.

In the case where the polar solvent is an alcohol, the stirring time is preferably 1 min or longer and 1 hour or shorter, more preferably 2 min or longer and 30 min or shorter, and still more preferably 3 min or longer and 20 min or shorter. In the case where the polar solvent is an alcohol, even when the stirring time in the cleaning step is made short, removal of impurities is enabled, not inferior to the case where the stirring time is made long. Further, making the stirring time short improves the productivity.

The cleaning with a polar solvent or a cleaning liquid may be carried out repeatedly a plurality of times. That is, the diamond particle cleaned as described above and separated from a polar solvent or a cleaning liquid may be added to a polar solvent or a cleaning liquid newly prepared and again subjected to a cleaning step.

The cleaning suffices as long as being carried out one or more times, but in the case of carrying out a plurality of times, carrying out two or more times is preferable. By carrying out the cleaning a plurality of times, impurities can be removed more and it becomes easy for the ionic conductivity Di to be further lowered. The number of times of the cleaning is not especially limited, but from the viewpoint of the productivity, is preferably 10 or less times, more preferably 5 or less times, and still more preferably 3 or less times.

In the case where the cleaning is carried out a plurality of times, in a part of the plurality of times, the cleaning may be carried out using a cleaning liquid having a cleaning agent added thereto, and in the rest thereof, the cleaning may be carried out using a polar solvent. In this case, the order of the cleaning with the cleaning liquid having the cleaning agent added thereto and the cleaning with the polar solvent is not especially limited, but it is preferable that the cleaning with the cleaning liquid is carried out once or a plurality of times, and thereafter, the cleaning with the polar solvent is carried out once or a plurality of times. Thereby, adhering of the cleaning agent on an obtained diamond particle is prevented, making it easy for the above ionic conductivity to become lower.

[Diamond-Containing Composition]

The diamond-containing composition according to the present invention comprises a diamond particle and a polymer matrix. The diamond-containing composition, by being made to comprise the diamond particle low in volume resistance and high in thermal conductivity, becomes excellent in either of the insulativity and the thermal conduction.

A diamond particle to be used in the diamond-containing composition according to the present invention is preferably the diamond particle described above, and its details are according to the above interpretation. In the present invention, by making the ionic conductivity Di of the diamond particle low as described above, or by making low the content of ionic impurities having a chromium atom, an iron atom and the like, the curability of the diamond-containing composition becomes good and the curing rate thereof becomes high. Further, even when the diamond-containing composition is stored for a long term, the reduction of the curability due to the deterioration of the polymer matrix is prevented.

The packing fraction of the diamond particle in the diamond-containing composition is preferably 10% by volume or higher and 90% by volume or lower, more preferably 20% by volume or higher and 85% by volume or lower, and still more preferably 25% by volume or higher and 80% by volume or lower. In the present invention, by making the packing fraction of the diamond particle to be not lower than these lower limit values, the thermal conduction of the diamond-containing composition can be made high. Further, even if the packing fraction of the diamond particle is made relatively high, by using the diamond particle having a low dissolving-out ionic conductivity, the curability of the diamond-containing composition can be made excellent. Further by making the packing fraction to be not higher than these upper limit values, the diamond particle can suitably be dispersed in the polymer matrix.

In the case of using singly the diamond particle as the thermally conductive filler (that is, in the case of using no thermally conductive filler other than the diamond particle), in order to make a diamond-containing composition excellent in thermal conduction, it is needed that the packing fraction of the diamond particle is made relatively high. Therefore, in the case of using singly the diamond particle as the thermally conductive filler, the packing fraction of the diamond particle is preferably 20% by volume or higher and 90% by volume or lower, more preferably 30% by volume or higher and 85% by volume or lower, and still more preferably 40% by volume or higher and 80% by volume or lower.

On the other hand, in the case of using the diamond particle concurrently with other thermally conductive fillers other than the diamond particle, described later, it is not needed that the packing fraction of the diamond particle is made so much high. Therefore, in such a case, the packing fraction of the diamond particle is preferably 10% by volume or higher and 80% by volume or lower, more preferably 20% by volume or higher and 75% by volume or lower, and still more preferably 25% by volume or higher and 60% by volume or lower.

Here, the "packing fraction" in the present description means a % by volume with respect to the total volume of the diamond-containing composition; for example, the packing fraction of the diamond particle means a % by volume taken by the diamond particle in the total volume of the diamond-containing composition. The volume of each component can be calculated from the weight and the specific gravity of the each component.

(Polymer Matrix)

Examples of the polymer matrix in the present invention include resins and liquid polymer components.

Examples of the resins include curable resins such as silicone resins, epoxy resins, urethane resins, phenol resins, unsaturated polyester resins and polyimide resins. The curable resins may be of any of moisture hardening type, thermosetting type and photo-curing type, but are preferably of a thermosetting type.

The resins may also be polyolefin resins such as polypropylene resins, polyethylene resins, poly(1-)butene resins and polypentene resins, polyester resins such as polyethylene terephthalate, and thermoplastic resins such as polystyrene resins, acrylonitrile-butadiene-styrene (ABS) resins, ethylene vinyl acetate copolymers (EVA), (meth)acrylic resins, polyamide resins and polyvinyl chloride resins (PVC).

Examples of the resins further include elastomer resins such as acrylonitrile butadiene rubber, ethylene-propylene-diene rubber, ethylene-propylene rubber, natural rubber, polybutadiene rubber and polyisoprene rubber. These elastomer resins may be liquid elastomers which become liquid at room temperature (23° C.) at the atmospheric pressure (1 atm), may be solid, or may be mixtures thereof.

As the elastomer resins, there can also be used thermoplastic elastomers such as polyester-based thermoplastic elastomers, polyurethane-based thermoplastic elastomers and styrene-based thermoplastic elastomers.

For the polymer matrix, as the liquid polymer components, silicone oils or the like may be used. These liquid polymer components may be used singly, or may be used concurrently with the resins.

Examples of the silicone oil include methyl phenyl silicone oil, dimethyl silicone oil and modified silicone oil. The viscosity, for example, at 25° C., of the silicone oil is, preferably 5 mPa·s or higher and 1,000 mPa·s or lower, more preferably 30 mPa·s or higher and 700 mPa·s or lower, and still more preferably 150 mPa·s or higher and 600 mPa·s or lower.

The liquid polymer components are liquid at room temperature at the atmospheric pressure in blending, and are liquid or gel components also in using. That is, the liquid polymer components are not cured with a curing agent or the like, and even if being cured, become liquid or gel also after being cured. Therefore, when the liquid polymer component is used singly or in a relatively high blend proportion, the heat-dissipating member formed of the diamond-containing composition can be made pasty.

The polymer matrix is, among the above, preferably one having curability. The polymer matrix having curability is preferably the above curable resins, and more preferably the above thermosetting resins.

The polymer matrix is preferably silicones such as silicone oil and silicone resins, but is preferably silicone resins such as condensation curing-type silicone resins and addition reaction curing-type silicone resins, and among these, is preferably the addition reaction curing-type silicone resins. Although the silicones are sometimes deteriorated by cleavage of their molecular chains by sulfur atoms and the like contained in impurities adhered on the surface of the diamond particle, in the present invention, the amount of such impurities is reduced. Therefore, the deterioration of the silicone is suppressed and the lowering of the curability after a long-term storage is suppressed.

The addition reaction curing-type silicone resins are composed preferably of a silicone compound as a main agent and a curing agent to cure the main agent. The silicone compound to be used as the main agent is preferably organopolysiloxanes having alkenyl groups, and specific examples thereof include both-vinyl-terminated organopolysiloxanes such as both-vinyl-terminated polydimethylsiloxane, both-vinyl-terminated polyphenylmethylsiloxane, both-vinyl-terminated dimethylsiloxane-diphenylsiloxane copolymers, both-vinyl-terminated dimethylsiloxane-phenylmethylsiloxane copolymers and both-vinyl-terminated dimethylsiloxane-diethylsiloxane copolymers.

In the silicone compound to be used as the main agent, the viscosity at 25° C. is preferably 5 mPa·s or higher and 1000 mPa·s or lower, more preferably 30 mPa·s or higher and 700 mPa·s or lower and still more preferably 150 mPa·s or higher and 600 mPa·s or lower.

Here, in the present specification, the viscosity can be measured by using a viscometer (Brookfield Rotational Viscometer DV-E) with a spindle No. 14 at a rotation frequency of 5 rpm at a measurement temperature of 25° C.

The curing agents to be used for the addition reaction curing-type silicone resins are not especially limited as long as being capable of curing the above-mentioned silicone compounds as the main agent, but are preferably organohydrogenpolysiloxanes being organopolysiloxanes having two or more hydrosilyl groups (SiH). The ratio (molar ratio) of the hydrosilyl groups to the vinyl groups of the silicone compounds is preferably 0.3 or higher and 5 or lower, more preferably 0.4 or higher and 4 or lower and still more preferably 0.6 or higher and 4 or lower. In the diamond-containing composition using the diamond particle, the reaction of the main agent with the curing agent does not progress due to the diamond particle in some cases, but when the molar ratio is made to be 0.6 or higher, the reaction progresses and the curability becomes good.

Examples of the organohydrogenpolysiloxanes include methylhydrosiloxane-dimethylsiloxane copolymers, polymethylhydrosiloxanes, polyethylhydrosiloxanes and methylhydrosiloxane-phenylmethylsiloxane copolymers. These may contain hydrosilyl groups at the terminals, or may not.

The viscosity at 25° C. of the curing agent is preferably 5 mPa·s or higher and 1000 mPa·s or lower, more preferably 30 mPa·s or higher and 700 mPa·s or lower and still more preferably 150 mPa·s or higher and 600 mPa·s or lower.

When the viscosity ranges of the above main agent and curing agent are made in the above ranges, since the diamond-containing composition is for example pasty and can be held certain shape, the diamond-containing composition can be easily disposed on electronic components and the like. Further, it becomes easy for the thermally conductive fillers such as diamond to be blended in large amounts on condition that the fillers are suitably dispersed.

In the case of using the silicone resin as the polymer matrix, a curing catalyst is usually blended in the diamond-containing composition. Examples of the curing catalyst include platinum-based catalysts, palladium-based catalysts and rhodium-based catalysts; and among these, the platinum-based catalysts are preferable. The curing catalyst is a catalyst to cure a silicone compound being a raw material of the silicone resin with the curing agent. The amount of the curing catalyst to be blended is, with respect to the total mass of the silicone compound and the curing agent, usually 0.1 to 200 ppm, and preferably 0.5 to 100 ppm.

In the present invention, since the ionic conductivity Di becomes lower than the predetermined value and the amount of ionic impurities such as metal atoms adhered on the diamond particle becomes small, the inactivation of the curing catalyst such as a platinum-based catalyst by the impurities such as metal atoms is prevented. Hence, even when an addition reaction-type silicone resin is used as the polymer matrix, the curability becomes excellent, enabling the curing rate to be made high.

The thermosetting resins may be of either of one-component curing type and two-component curing type, but are preferably two-component curing type ones. In the case of using the two-component curing type resin, the diamond-containing composition can be prepared by mixing a first component containing the above main agent with a second component containing the above curing agent.

Here, in the case of using the two-component curing type resin, the diamond particle may be blended in one of the first component and the second component, or may be blended in the both. This similarly applies also to other thermally conductive fillers described later.

The volume proportion of the polymer matrix is, with respect to the total amount of the diamond-containing composition, preferably 8% by volume or higher and 70% by volume or lower, more preferably 10% by volume or higher and 60% by volume or lower, and still more preferably 12% by volume or higher and 48% by volume or lower. When the volume proportion of the polymer matrix is not lower than these lower limit values, more thermally conductive fillers such as the diamond particle dispersed in the polymer matrix can be held by the polymer matrix, and the diamond-containing composition can maintain a certain shape. Further by making the volume proportion to be not higher than these upper limit values, the thermally conductive filler such as the diamond particle can be blended in the diamond-containing composition in not smaller than a certain amount.

(Other Thermally Conductive Fillers)

The diamond-containing composition according to the present invention may further comprise thermally conductive fillers other than the diamond particle (hereinafter, referred to also as "other thermally conductive fillers") as the thermally conductive filler. By containing the other thermally conductive fillers, the packing fraction of the whole thermally conductive filler is improved, enabling the thermal conduction to be improved.

As the other thermally conductive fillers, from the viewpoint of the electric insulativity, materials having a low electric conductivity are used; examples of the materials include carbides, nitrides, oxides, hydroxides and carbonaceous materials other than diamond.

Examples of the carbides include silicon carbide, boron carbide, aluminum carbide, titanium carbide and tungsten carbide. Examples of the nitrides include silicon nitride, boron nitride, aluminum nitride, gallium nitride, chromium nitride, tungsten nitride, magnesium nitride, molybdenum nitride and lithium nitride. Examples of the oxides include iron oxide, silicon oxide (silica), aluminum oxide such as alumina and boehmite, magnesium oxide, titanium oxide, cerium oxide and zirconium oxide. Examples of the hydroxides include aluminum hydroxide, calcium hydroxide and magnesium hydroxide. Examples of the carbonaceous materials include carbon black, graphite, graphene, fullerene, carbon nanotubes and carbon nanofibers. Further talc being a silicate mineral and the like can also be used.

These other thermally conductive fillers may be used singly or concurrently in two or more.

The thermal conductivity of the other thermally conductive fillers is, from the viewpoint of improving the thermal conduction, preferably 8 W/m·K or higher and more preferably 20 W/m·K or higher.

The other thermally conductive fillers are, from the viewpoint of the thermal conduction and the electric insulativity, preferably one or more selected from aluminum oxide, magnesium oxide, boron nitride, talc, aluminum nitride and graphene, more preferably one or more selected from aluminum oxide, magnesium oxide and aluminum nitride and still more preferably one or more selected from aluminum oxide and magnesium oxide.

The other thermally conductive fillers may be surface-treated. By surface-treating the other thermally conductive fillers, it becomes easy for them to conform to the polymer matrix, and it becomes easy for them to be homogeneously dispersed together with a large amount of the diamond particle in the polymer matrix.

The other thermally conductive fillers are surface-treated with a surface treating agent such as a silane compound, an organotitanium compound, an organoaluminum compound or a phosphate compound, and preferably with a silane compound. Examples of the silane compound include well-known silane coupling agents.

The other thermally conductive fillers have a spheroidicity of, for example, 0.5 or higher, preferably 0.55 or higher and more preferably 0.6 or higher. The shape is closer to a sphere the nearer the spheroidicity is to 1; when the spheroidicity is high, it becomes easy for the packing fraction of the other thermally conductive fillers to be raised. The upper limit of the spheroidicity is not especially limited, and is 1.

Further, in the present invention, when the spheroidicity of the diamond particle is high, besides the other thermally conductive fillers, as described above, it becomes easy for the total packing amount of the diamond particle and the other thermally conductive fillers to be raised.

The shapes of the other thermally conductive fillers are not especially limited, and may be any of plate shapes, scaly shapes, needlelike shapes, fibrous shapes, tubular shapes, globular shapes and crushed shapes, but are preferably either of globular shapes and crushed shapes. Here, being globular means being spherical or a shape approximating to a sphere, and has a spheroidicity of 0.8 or higher. Further, the crushed shape has a spheroidicity of, for example, 0.5 or higher and lower than 0.8, preferably 0.55 or higher and lower than 0.8 and more preferably 0.6 or higher and lower than 0.8.

The average particle diameter of the other thermally conductive fillers is, for example, 0.1 μm or larger and 250 μm or smaller. When the average particle diameter is 0.1 μm or larger, by concurrent use thereof with the diamond particle, it becomes easy for the thermal conduction to be improved. Further, when the diameter is 250 μm or smaller, even when the other thermally conductive fillers, besides the diamond particle, are packed densely, it becomes difficult for such a disadvantage that the fillers are not homogeneously dispersed to occur. From these viewpoints, the average particle diameter of the other thermally conductive fillers is preferably 0.2 μm or larger and 200 μm or smaller and more preferably 0.4 μm or larger and 150 μm or smaller.

The packing fraction of the other thermally conductive fillers may suitably be regulated so that the total packing fraction of the fillers falls into the range described later, but is preferably 75% by volume or lower and more preferably 70% by volume or lower. By making the packing fraction to be not higher than these upper limit values, since the diamond particle can be blended in the diamond-containing composition in not smaller than a certain amount, it becomes easy for the thermal conduction to be improved. Further, the packing fraction of the other thermally conductive fillers is preferably 2% by volume or higher and more preferably 10% by volume or higher. When the packing fraction is not lower than these lower limit values, it becomes easy for the effect of blending the other thermally conductive fillers to be exhibited.

Further, the packing fraction of the other thermally conductive fillers is, from the viewpoint of the electric insulativity and the thermal conduction, with respect to the packing fraction of the diamond particle, preferably 0.1 or higher and 5 or lower and more preferably 0.2 or higher and 4 or lower, and from the viewpoint of more enhancing the electric insulativity, still more preferably 0.3 or higher and 2 or lower.

The other thermally conductive fillers may be, for example, thermally conductive fillers having an average particle diameter of 10 μm or larger and 250 μm or smaller (hereinafter, referred to also as "large particle diameter thermally conductive fillers"), or thermally conductive fillers having an average particle diameter of 0.1 μm or larger and smaller than 10 μm (hereinafter, referred to also as "small particle diameter thermally conductive fillers"). Further, the other thermally conductive fillers may use both of the large particle diameter thermally conductive fillers and the small particle diameter thermally conductive fillers.

In the large particle diameter thermally conductive fillers, the average particle diameter is preferably 15 μm or larger and 200 μm or smaller, more preferably 18 μm or larger and 150 μm or smaller and still more preferably 20 μm or larger and 125 μm or smaller. The large particle diameter thermally conductive fillers may be used singly in one kind thereof or concurrently in two or more kinds thereof having different average particle diameters from each other.

In the small particle diameter thermally conductive fillers, the average particle diameter is preferably 0.2 μm or larger and 8 μm or smaller and more preferably 0.4 μm or larger and 7 μm or smaller.

The small particle diameter thermally conductive fillers may be used singly in one kind thereof or concurrently in two or more kinds thereof having different average particle diameters from each other.

In the present invention, it is preferable that the other thermally conductive fillers are contained by being combined complementarily with the diamond particle. In order to improve the thermal conduction, specifically, it is preferable that with respect to thermally conductive fillers (the diamond particle and the other thermally conductive fillers), large particle diameter fillers and small particle diameter fillers are combined and blended in not smaller than predetermined amounts of both.

Therefore, in the case where the diamond particle contains no large particle diameter diamond, or in the case where even when the large particle diameter diamond is contained, the amount thereof is small, it is preferable that at least the large particle diameter thermally conductive fillers are blended as the other thermally conductive fillers.

Similarly, in the case where the diamond particle contains no small particle diameter diamond, or in the case where even when the small particle diameter diamond is contained, the amount thereof is small, it is preferable that at least the other thermally conductive fillers with small particle diameter are blended as the other thermally conductive fillers.

Further, in the case where both of the small particle diameter diamond and the large particle diameter diamond are contained in suitable amounts, it is preferable that for the thermally conductive fillers, both of the small particle diameter thermally conductive fillers and the large particle diameter thermally conductive fillers are blended in suitable amounts.

The total packing fraction of the thermally conductive fillers (that is, the total of a packing fraction of the diamond particle and a packing fraction of the other thermally conductive fillers) is preferably 30% by volume or higher and 92% by volume or lower, more preferably 40% by volume or higher and 90% by volume or lower and still more preferably 50% by volume or higher and 85% by volume or lower. When the total packing fraction is not lower than these lower limit values, the thermal conduction can be made good. When the total packing fraction is not higher than the upper limit values, the thermally conductive fillers can be suitably dispersed in the polymer matrix.

(Other Additives)

The diamond-containing composition according to the present invention may contain, as required, additives usually used for heat-dissipating members, such as a dispersant, an antioxidant, a thermal stabilizer, a colorant, a fire retardant and an antistatic agent. Further in the case of using the thermosetting resin for the diamond-containing composition, a reaction retardant may be contained.

[Curing Properties of the Diamond-Containing Composition]

(The Change Ratio in the Curing Starting Time, and the 25-Min/30-Min Curing Ratio)

The diamond-containing composition according to the present invention comprises the diamond particle and the polymer matrix, and has the following curing properties.

That is, the diamond-containing composition according to the present invention has a change ratio in the curing starting time represented by $((A2-A1)/(A4-A1))\times 100$ of 50% or higher, wherein A2 represents a complex elastic modulus of the diamond-containing composition after 5 min when the diamond-containing composition is heated and cured at 70° C.; A4 represents a complex elastic modulus thereof after 30 min when the diamond-containing composition is heated and cured at 70° C.; and A1 represents a complex elastic modulus at the 70° C.-heating starting time (that is, after 0 min).

When the change ratio in the curing starting time is lower than 50%, the curing rate of the diamond-containing composition becomes low, making the diamond-containing composition to become liable to cause curing failure in practical usage. Hence, such disadvantages are caused in some cases that the composition causes liquid sagging or the like and contaminates electronic devices, and cannot hold heat-dissipating members in fixed shapes.

The change ratio in the curing starting time of the diamond-containing composition is preferably 55% or higher, and more preferably 60% or higher. When the change ratio in the curing starting time is not lower than these lower limit values, the curing rate becomes much higher and the curability of the diamond-containing composition becomes excellent. Hence, it becomes difficult for disadvantages such as liquid sagging to occur. Then, although the higher the change ratio in the curing starting time, the better, the change ratio is, for example, 100% or lower.

Then, it is preferable that there becomes 50% or higher the ratio $(A3/A4\times100)$(hereinafter, referred to also as "25-min/30-min curing ratio") of a complex elastic modulus A3 after 25 min when the diamond-containing composition is heated and cured at 70° C. to a complex elastic modulus A4 after 30 min when the diamond-containing composition is heated and cured at 70° C. When the 25-min/30-min curing ratio becomes 50% or higher, the curing rate of the diamond-containing composition becomes high, enabling the diamond-containing composition to be cured in a short time. Therefore, it becomes more difficult for the liquid sagging or the like caused by curing failure and the like to be generated.

In order to make the curing rate high and cure the diamond-containing composition in a shorter time, the 25-min/30-min curing ratio of the diamond-containing composition is preferably 65% or higher and 100% or lower, and more preferably 80% or higher and 100% or lower.

(The Curability Change Ratio after an Accelerated Deterioration Test)

The diamond-containing composition according to the present invention can maintain high curability even after a long-term storage, and exhibits a low curability change ratio after an accelerated deterioration test.

Here, the curability change ratio is represented by the proportion $(A4/B4\times100)$ of a complex elastic modulus A4 of the diamond-containing composition after curing at 70° C. for 30 min before a deterioration to a complex elastic modulus B4 thereof after curing at 70° C. for 30 min after the deterioration.

Then, in a two-component curing type diamond-containing composition, the complex elastic modulus A4 is a complex elastic modulus when a first component and a second component thereof before a thermally accelerating deterioration are mixed, and heated and cured at 70° C. for 30 min. Then, the complex elastic modulus B4 is a complex elastic modulus when the first component and the second component thereof after being each subjected to the thermally accelerating deterioration at 70° C. for 1 week are mixed, and heated and cured at 70° C. for 30 min.

In the present invention, it is preferable that the curability change ratio after the accelerated deterioration test is 75% or higher and 125% or lower. The curability change ratio after the accelerated deterioration test falling in such a range makes it difficult for the diamond-containing composition according to the present invention to be deteriorated by a long-term storage, enabling the stability to be enhanced. The curability change ratio after the accelerated deterioration test is, from these viewpoints, preferably 85% or higher and 115% or lower, and more preferably 95% or higher and 105% or lower.

In order that the diamond-containing composition has the above curing properties, the diamond particle described above can well be used as a diamond particle. Further the polymer matrix described above can well be also used as a polymer matrix, but in order that the diamond-containing composition is made to have the above curing properties, the polymer matrix having a curability suffices as described above; the polymer matrix is preferably curable resins such as thermosetting resins, and among these, silicone resins are more preferable and addition reaction curing-type silicone resins are especially preferable. The details of these polymer matrices are as described above.

Here, the above change ratio in the curing starting time and 25-min/30-min curing ratio are measured by using a rheometer as described below.

First, in the case where the diamond-containing composition is a one-component curing type one, the diamond-containing composition as it is is, and in the case where the diamond-containing composition is a two-component curing type one, the diamond-containing composition obtained by mixing a first component and a second component thereof is immediately, set on a rheometer and heated from 30° C. up to 70° C. with taking 500 sec. With the time point when the diamond-containing composition reaches 70° C. being taken as the start of heating (0 min), the complex elastic modulus at this time is measured as the complex elastic modulus A1.

Thereafter, while the diamond-containing composition is maintained at 70° C., the complex elastic moduli after the lapse of 5 min, after the lapse of 25 min and after the lapse of 30 min are measured as the complex elastic modulus A2, the complex elastic modulus A3 and the complex elastic modulus A4, respectively. By using the measured complex elastic moduli A1 to A4, and according to the above calculation expression, the change ratio in the curing starting time and the 25-min/30-min curing ratio can be determined.

Here, the details of the measurement condition by the rheometer are according to descriptions in Examples.

Then, with regard to the curability change ratio after the accelerated deterioration test, the diamond-containing composition before the heating deterioration and that after being deteriorated at 70° C. for 1 week are each raised in temperature and heated under the same condition as in the above; and the complex elastic moduli thereof after the lapse of 30 min from the time point when the diamond-containing compositions reach 70° C. are measured and are taken as the complex elastic modulus A4 and the complex elastic modulus B4, respectively. By using the measured complex elastic modulus A4 and complex elastic modulus B4, and according to the above calculation expression, the curability change ratio after the accelerated deterioration test can be determined.

Here, although the diamond-containing composition is cured at 70° C. in order to measure the curing properties of the diamond-containing composition as described above, there is no need to cure the diamond-containing composition at 70° C. in practical usage, and curing may be carried out, for example, nearly at normal temperature.

(Preparation of the Diamond-Containing Composition)

The diamond-containing composition according to the present invention may be prepared by mixing the polymer matrix, the diamond particle, and further the other thermally conductive fillers and the additives such as the dispersant, which are blended according to needs. A method of mixing these components is not especially limited, but may involve, for example, adding the diamond particle and further the other thermally conductive fillers and the additives, which are blended according to needs, to the polymer matrix, and thereafter stirring or kneading the mixture to prepare the diamond-containing composition. In the case of the two-component curing type thermosetting resin, as described above, the diamond-containing composition may be prepared by mixing the first component and the second component, which are prepared in advance. When the first component and the second component are each prepared, similarly, various components constituting each of the first component and the second component may be mixed for the preparation.

[Heat-Dissipating Member]

The heat-dissipating member according to the present invention is formed of the above diamond-containing composition. For example, in the case where the polymer matrix contains a curable resin, the heat-dissipating member is enabled to be obtained as a heat-dissipating member molded into a predetermined shape by making the diamond-containing composition into the predetermined shape and thereafter suitably curing the resultant by heating or otherwise. Then in the case where the polymer matrix is thermally curable, the diamond-containing composition may be heated and cured, or may be cured without being heated. For example, a two-component type thermosetting resin can be fully cured, even without being heated, nearly at normal temperature (for example, about 10° C. or higher and 40° C. or lower).

Further, also in the case except for the case where the polymer matrix contains a curable resin, the diamond-containing composition may be made into a predetermined shape to make the heat-dissipating member. A method of making the diamond-containing composition into a predetermined shape is not especially limited, and may involve coating, casting potting, extruding or the like to thereby achieve a shape such as a thin film, sheet, block, indeterminate or another shape.

The heat-dissipating member according to the present invention is used, for example, in electric device interiors. The heat-dissipating member according to the present invention, since being excellent in the electric insulativity and the heat dissipativity, can secure high heat dissipativity without causing abnormal actions even when being used in the electric device interiors.

More specifically, the heat-dissipating member is arranged on an electronic component and used for dissipating heat generated by the electronic component, and used preferably by being arranged on an irregular surface of an electronic component having irregularities on the surface. Although the heat-dissipating member, due to being arranged on an irregular surface, sometimes generates thickness unevenness in which the thicknesses of some portions are different from those of other portions, the heat-dissipating member according to the present invention, since using the diamond particle, being excellent in the thermal conduction and the heat dissipativity, can suppress heat spots generated by the thickness unevenness.

Further, it is preferable that the heat-dissipating member according to the present invention is used by being arranged so as to fill gaps between two facing members. It is preferable that out of the two facing members, for example, one member is an electronic component and the other member is one of a heat sink, a housing for an electronic device, a substrate and the like for dissipating heat generated by the electronic component. It is preferable that in the two facing members, one of the surfaces facing each other has irregularities. When one of the surfaces facing each other has irregularities, although unevenness is generated in the thickness of the heat-dissipating member conforming to the irregularities, in some cases, the heat-dissipating member according to the present invention, since the heat-dissipating member is excellent in the heat dissipativity due to the use of the diamond particle, can suppress heat spots generated by the thickness unevenness. Then, the heat-dissipating member, when being interposed and used between two members, is compressed, but the diamond-containing composition according to the present invention, since hardly causing liquid sagging when being compressed, can suitably be used for such applications.

EXAMPLES

Hereinafter, Examples of the present invention will be described. However, the present invention is not any more limited to the following Examples.

Measurement methods and evaluation methods of various physical properties of the present invention were as follows.

[Ionic Conductivity Di]

5 g of a diamond particle was subjected to a PCT (pressure cooker test) in an autoclave using 10 g of distilled water and under the condition of a temperature of 120° C. and a relative humidity of 100 RH % for 12 hours, according to IEC68-2-66, to cause substances adhered on the diamond particle to dissolve out in the distilled water to thereby obtain an aqueous solution. The ionic conductivity of the aqueous solution was measured by using a portable ionic conductivity meter (trade name: "LAQUA act", manufactured by Horiba Ltd.) to thereby obtain an ionic conductivity Ds of the dissolved-out liquid. The ionic conductivity of the distilled water was also measured by using the portable ionic conductivity meter to thereby obtain an ionic conductivity Dw of the distilled water. From the obtained ionic conductivities Ds and Dw, the ionic conductivity Di originated from the diamond particle was determined by the following expression. Here, the measurement of the ionic conductivity was carried out at 23° C.

$$Di=Ds-Dw$$

[Measurement of the Amount of Impurities]

There were measured by ICP analysis the kinds of impurities adhered on the surface of a diamond particle, and the contents thereof with respect to the diamond particle.

[The Change Ratio in the Curing Starting Time and the 25-Min/30-Min Curing Ratio]

The change ratio in the curing starting time and the 25-min/30-min curing ratio of a diamond-containing composition were measured by using a rheometer (ARES, manufactured by TA Instruments Inc.). Specifically, in the case of being of a one-component curing type, the diamond-containing composition as it was was, and in the case of being of a two-component curing type, the diamond-containing composition obtained by mixing a first component and a second component was immediately, set on the rheometer.

Then, the diamond-containing composition was raised in temperature from 30° C. up to 70° C. with taking 500 sec, and thereafter held at 70° C. for 30 min, under the conditions of a strain of 1%, a frequency of 6.28 Hz, a rotary plate diameter of 8 mm and a thickness of 1 mm, while the complex elastic moduli A1 to A4 were measured according to the method described in the present description. From the complex elastic moduli A1 to A4, there were determined the change ratio in the curing starting time $[(A2-A1)/(A4-A1))\times 100]$ and the 25-min/30-min curing ratio $[A3/A4\times 100]$.

Here, the complex elastic moduli A1 to A4 were as follows.

The complex elastic modulus A1: a complex elastic modulus of a diamond-containing composition at the time point (0 min) when 70° C. was reached The complex elastic modulus A2: a complex elastic modulus thereof after 70° C. was reached and thereafter, 5 min elapsed The complex elastic modulus A3: a complex elastic modulus thereof after 70° C. was reached and thereafter, 25 min elapsed The complex elastic modulus A4: a complex elastic modulus thereof after 70° C. was reached and thereafter, 30 min elapsed

[The Curability Change Ratio after an Accelerated Deterioration Test]

A first component and a second component constituting a diamond-containing composition were left in a thermostatic chamber kept at 70° C. and at a humidity of 50 RH % for 7 days to thereby be acceleratedly thermally deteriorated. Thereafter, by using the acceleratedly thermally deteriorated diamond-containing composition, there was measured the complex elastic modulus B4 thereof after the lapse of 30 min at 70° C. from the time point when the diamond-containing composition was raised in temperature and heated under the same condition in the above and reached 70° C. From the complex elastic modulus B4 and the complex elastic modulus A4 measured in the above, the curability change ratio after the accelerated deterioration test $[A4/B4\times 100]$ was calculated.

The 25-min/30-min curing ratio and the curability change ratio after the accelerated deterioration test obtained in the above were evaluated according to the following evaluation criteria.

(The 25-Min/30-Min Curing Ratio)

A: The 25-min/30-min curing ratio became 80% or higher; the curability was excellent; and a diamond-containing composition could be cured in a short time.

B: The 25-min/30-min curing ratio was 65% or higher and lower than 80%; the curability was high; and the diamond-containing composition could be cured in a relatively short time.

C: The 25-min/30-min curing ratio was 50% or higher and lower than 65%; the curability was good; and the diamond-containing composition could be cured in a time posing no practical problem.

D: The 25-min/30-min curing ratio was lower than 50%; the curability was insufficient; and curing failure was caused even when the diamond-containing composition was cured over a long time.

(The Curability Change Ratio after the Accelerated Deterioration Test)

A: The curability change ratio after the accelerated deterioration test was 100±5%; the curability did almost not change by the accelerated deterioration; and excellent storage stability was exhibited.

B: The curability change ratio after the accelerated deterioration test was, though being out of the range of 100±5%, within the range of 100±15%; the curability little changed by the accelerated deterioration; and high storage stability was exhibited.

C: The curability change ratio after the accelerated deterioration test was, though being out of the range of 100±15%, within the range of 100±25%; and storage stability in a level posing no practical problem was exhibited.

D: The curability change ratio after the accelerated deterioration test was out of the range of 100±25%; and the curability changed greatly and the storage stability was low.

[Evaluation of Liquid Sagging]

A diamond-containing composition obtained by mixing a first component and a second component prepared in each of Examples and Comparative Examples was applied on a glass plate of 10 cm×10 cm×1 cm in thickness so that the initial applied area became 5 cm×5 cm and the initial applied thickness became 5 mm. Thereafter, a glass plate of 10 cm×10 cm×1 cm in thickness was superposed on the coated film composed of the diamond-containing composition, and left in such a state that the thickness direction of the coated film became vertical, in an environment of 23° C. and 50 RH % for 12 hours.

The evaluation of liquid sagging was carried out according to the following evaluation criteria using a percentage increase of an occupied area of the coated film after being left for 12 hours with respect to the initial applied area.

A: The percentage increase of the area of a coated film became 5% or lower; and liquid sagging did not substantially occur.

B: The percentage increase of the area of the coated film became higher than 5% and 10% or lower; and only a small amount of liquid sagging occurred.

C: The percentage increase of the area of the coated film became higher than 10% and 15% or lower; and liquid sagging occurred only in a level posing no practical problem.

D: The percentage increase of the area of the coated film became higher than 15%; and liquid sagging remarkably occurred.

Raw material diamond particles used in Examples and Comparative Examples were as follows.

<Raw Material Diamond Particles>

Diamond particle (1): manufactured by Tomei Diamond Co., Ltd., trade name: "CMM Grade", average particle diameter: 40 μm, spheroidicity: 0.6, crushed product Diamond particle (2): manufactured by Tomei Diamond Co., Ltd., trade name: "TMS Grade", average particle diameter: 70 μm, spheroidicity: 0.9, globular product Diamond particle (3): manufactured by Hyperion Materials & Technologies Inc., trade name: "GMM Diamond", average particle diameter: 40 μm, spheroidicity: 0.6, crushed product Diamond particle (4): manufactured by Element Six (UK) Ltd., trade name: "MDA", average particle diameter: 40 μm, spheroidicity: 0.6, crushed product Diamond particle (5): manufactured by Saint Gobain Co., Ltd., trade name: "MBE Grade", average particle diameter: 20 μm, spheroidicity: 0.6, crushed product Diamond particle (6): manufactured by Hyperion Materials & Technologies Inc., trade name: "MBG", average particle diameter: 70 μm, spheroidicity: 0.9, globular product Diamond particle (7): manufactured by Tomei Diamond Co., Ltd., trade name: "IMS", average particle diameter: 70 μm, spheroidicity: 0.9, globular product Diamond particle (8): manufactured by Iljin Diamond Co., Ltd., trade name: "IMPM", average particle diameter: 40 μm, spheroidicity: 0.6, crushed product Diamond particle (9): manufactured by Tomei Diamond Co., Ltd., trade name: "CMM Grade", average particle diameter: 4 μm, spheroidicity: 0.6, crushed product Example 1

(Cleaning Step)

10 g of the diamond particle (1) as a raw material diamond particle was added to a beaker in which 50 g of distilled water (pH=7) kept at 70° C. as a cleaning liquid was put, and thereafter stirred for 3 hours under the stirring condition of 500 rpms by using a separable flask with a blade of a stirring apparatus "Three-One Motor". After the finish of the stirring, a diamond particle was separated by filtration and dried to thereby obtain a diamond particle of Example 1. In Example 1, the surface of the diamond particle was analyzed by ICP; as a result thereof, a Cr element was 0.1 ppm by mass, and an Fe element was 0.1 ppm by mass.

(Preparation of a Diamond-Containing Composition)

8 parts by mass of the diamond particle obtained in the above was added to 2 parts by mass of a vinyl-both terminated organopolysiloxane (whose viscosity at 25° C. was 300 mPa·s) constituting a main agent of an addition reaction-type silicone resin as a polymer matrix, and 0.01 part by mass of a reaction retardant and a catalytic amount of a platinum catalyst were further added to thereby prepare a first component of a diamond-containing composition.

Further, 8 parts by mass of the diamond particle obtained in the above was added to 2 parts by mass of an organohydrogenpolysiloxane (whose viscosity at 25° C. was 400 mPa·s) constituting a curing agent of the addition reaction-type silicone resin to thereby prepare a second component of the diamond-containing composition.

The first component and the second component were mixed in a mass ratio (first component/second component) of 1:1 to thereby fabricate the diamond-containing composition, which was then evaluated. The results are shown in Table 1. Here, the packing fraction of the diamond particle in the diamond-containing composition was 53% by volume, and that of the polymer matrix was 47% by volume.

Example 2

The same procedure was carried out as in Example 1, except for altering the stirring time in the cleaning step to 6 hours.

Example 3

The same procedure was carried out as in Example 2, except for carrying out the same cleaning step two times on the diamond particle obtained in Example 2.

Example 4

10 g of the diamond particle (1) as a raw material diamond particle was added to a beaker in which 50 g of ethanol (pH=7) kept at 25° C. was put, and thereafter stirred for 5 min under the stirring condition of 500 rpms. After the finish of the stirring, a diamond particle was separated by filtration and dried to thereby obtain a diamond particle of Example 4. Thereafter, a diamond-containing composition was prepared and evaluated as in Example 1.

Example 5

The same procedure was carried out as in Example 4, except for carrying out the same cleaning step two times on the diamond particle obtained in Example 4.

Examples 6 to 10

In Examples 6 to 10, respectively, the same procedure was carried out as in Examples 1 to 5, except for altering a diamond particle used to the diamond particle (2).

Examples 11 to 41

The procedure was carried out as in Example 3, by altering the kind of a cleaning liquid for cleaning a raw material diamond particle or/and the kind of the raw material diamond particle to those indicated in Tables 1 to 4.

Here, in each Example, an acetic acid aqueous solution used was one at a pH of 4, and a sodium hydroxide aqueous solution used was one at a pH of 11. A citric acid aqueous solution used was a 0.26 mol/L (pH2) one in which 5 g of citric acid was dissolved in 100 g of water.

Comparative Example 1

The diamond particle (1) having been subjected to no cleaning step was used as a diamond particle of Comparative Example 1. The surface of the diamond particle of Comparative Example 1 was analyzed by ICP; and as a result, a Cr element was 1 ppm by mass, and an Fe element was 3 ppm by mass. A diamond-containing composition was prepared and evaluated as in Example 1, except for using the diamond particle of Comparative Example 1.

Comparative Examples 2 to 9

The diamond particles (2) to (9) having been subjected to no cleaning step were used as diamond particles of Comparative Examples 2 to 9, respectively. Diamond-containing compositions were prepared and evaluated as in Example 1, except for using the diamond particles of Comparative Examples 2 to 9, respectively.

TABLE 1

| | | Example | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Cleaning Condition | Kind of Diamond | (1) | (1) | (1) | (1) | (1) | (2) | (2) | (2) | (2) | (2) | (1) | (1) | (1) |
| | Cleaning liquid | water | water | water | EtOH | EtOH | water | water | water | EtOH | EtOH | acetic acid aqueous solution | citric acid aqueous solution | NaOH aqueous solution |
| | Time | 3 h | 6 h | 6 h | 5 min | 5 min | 3 h | 6 h | 6 h | 5 min | 5 min | 6 h | 6 h | 6 h |
| | Temperature | 70° C. | 70° C. | 70° C. | 25° C. | 25° C. | 70° C. | 70° C. | 70° C. | 25° C. | 25° C. | 70° C. | 70° C. | 70° C. |
| | Number of Times | 1 | 1 | 2 | 1 | 2 | 1 | 1 | 2 | 1 | 2 | 2 | 2 | 2 |
| Ionic Conductivity Di (mS/m) | | 0.654 | 0.505 | 0.404 | 0.678 | 0.597 | 0.573 | 0.382 | 0.332 | 0.643 | 0.564 | 0.432 | 0.385 | 0.675 |
| Curing Properties | Change ratio in the curing starting time (%) | 74 | 75 | 80 | 65 | 68 | 73 | 76 | 82 | 63 | 67 | 70 | 80 | 65 |
| | 25-min/30-min curing ratio | B | A | A | B | B | B | A | A | B | B | A | A | B |
| | Curability change ratio after accelerated deterioration test | B | A | A | B | B | B | A | A | B | B | A | A | B |
| Evaluation of Liquid Sagging | | A | A | A | A | A | A | A | A | A | A | A | A | A |

TABLE 2

| | | Example | | | | | | | | | | | |
|---|---|---|---|---|---|---|---|---|---|---|---|---|---|
| | | 14 | 15 | 16 | 17 | 18 | 19 | 20 | 21 | 22 | 23 | 24 | 25 |
| Cleaning Condition | Kind of Diamond | (3) | (3) | (3) | (3) | (4) | (4) | (4) | (4) | (5) | (5) | (5) | (5) |
| | Cleaning liquid | acetic acid aqueous solution | citric acid aqueous solution | NaOH aqueous solution | water | acetic acid aqueous solution | citric acid aqueous solution | NaOH aqueous solution | water | acetic acid aqueous solution | citric acid aqueous solution | NaOH aqueous solution | water |
| | Time | 6 h | 6 h | 6 h | 6 h | 6 h | 6 h | 6 h | 6 h | 6 h | 6 h | 6 h | 6 h |
| | Temperature | 70° C. | 70° C. | 70° C. | 70° C. | 70° C. | 70° C. | 70° C. | 70° C. | 70° C. | 70° C. | 70° C. | 70° C. |
| | Number of Times | 2 | 2 | 2 | 2 | 2 | 2 | 2 | 2 | 2 | 2 | 2 | 2 |
| Ionic Conductivity Di (mS/m) | | 0.457 | 0.429 | 0.659 | 0.597 | 0.643 | 0.487 | 0.629 | 0.568 | 0.519 | 0.412 | 0.597 | 0.487 |
| Curing Properties | Change ratio in the curing starting time (%) | 72 | 75 | 63 | 68 | 67 | 71 | 69 | 70 | 75 | 81 | 66 | 73 |
| | 25-min/30-min curing ratio | A | A | B | A | A | A | B | A | A | A | B | A |
| | Curability change ratio after accelerated deterioration test | A | A | B | A | A | A | B | A | A | A | B | A |
| Evaluation of Liquid Sagging | | A | A | A | A | A | A | A | A | A | A | A | A |

TABLE 3

| | | Example | | | | | | | | | | | |
|---|---|---|---|---|---|---|---|---|---|---|---|---|---|
| | | 26 | 27 | 28 | 29 | 30 | 31 | 32 | 33 | 34 | 35 | 36 | 37 |
| Cleaning Condition | Kind of Diamond | (6) | (6) | (6) | (6) | (7) | (7) | (7) | (7) | (8) | (8) | (8) | (8) |
| | Cleaning liquid | acetic acid aqueous solution | citric acid aqueous solution | NaOH aqueous solution | water | acetic acid aqueous solution | citric acid aqueous solution | NaOH aqueous solution | water | acetic acid aqueous solution | citric acid aqueous solution | NaOH aqueous solution | water |

TABLE 3-continued

| | | Example | | | | | | | | | | | |
|---|---|---|---|---|---|---|---|---|---|---|---|---|---|
| | | 26 | 27 | 28 | 29 | 30 | 31 | 32 | 33 | 34 | 35 | 36 | 37 |
| | Time | 6 h | 6 h | 6 h | 6 h | 6 h | 6 h | 6 h | 6 h | 6 h | 6 h | 6 h | 6 h |
| | Temperature | 70° C. | 70° C. | 70° C. | 70° C. | 70° C. | 70° C. | 70° C. | 70° C. | 70° C. | 70° C. | 70° C. | 70° C. |
| | Number of Times | 2 | 2 | 2 | 2 | 2 | 2 | 2 | 2 | 2 | 2 | 2 | 2 |
| Ionic Conductivity Di (mS/m) | | 0.555 | 0.354 | 0.639 | 0.513 | 0.678 | 0.398 | 0.623 | 0.515 | 0.598 | 0.320 | 0.649 | 0.555 |
| Curing Properties | Change ratio in the curing starting time (%) | 79 | 83 | 70 | 74 | 61 | 78 | 65 | 70 | 69 | 84 | 67 | 78 |
| | 25-min/30-min curing ratio | A | A | B | A | A | A | B | A | A | A | B | A |
| | Curability change ratio after accelerated deterioration test | A | A | B | A | A | A | B | A | A | A | B | A |
| Evaluation of Liquid Sagging | | A | A | A | A | A | A | A | A | A | A | A | A |

TABLE 4

| | | Example | | | | Comparative Example | | | | | | | | |
|---|---|---|---|---|---|---|---|---|---|---|---|---|---|---|
| | | 38 | 39 | 40 | 41 | 1 | 2 | 3 | 4 | 5 | 6 | 7 | 8 | 9 |
| Kind of Diamond | | (9) | (9) | (9) | (9) | d) | (2) | (3) | (4) | (5) | (6) | (7) | (8) | (9) |
| Cleaning Condition | Cleaning liquid | acetic acid aqueous solution | citric acid aqueous solution | NaOH aqueous solution | water | — | — | — | — | — | — | — | — | — |
| | Time | 6 h | 6 h | 6 h | 6 h | — | — | — | — | — | — | — | — | — |
| | Temperature | 70° C. | 70° C. | 70° C. | 70° C. | — | — | — | — | — | — | — | — | — |
| | Number of Times | 2 | 2 | 2 | 2 | — | — | — | — | — | — | — | — | — |
| Ionic Conductivity Di (mS/m) | | 0.617 | 0.348 | 0.613 | 0.497 | 0.971 | 2.72 | 1.25 | 2.98 | 1.09 | 1.03 | 2.76 | 1.63 | 1.873 |
| Curing Properties | Change ratio in the curing starting time (%) | 62 | 83 | 69 | 75 | 20 | 30 | 34 | 15 | 34 | 29 | 17 | 24 | 27 |
| | 25-min/30-min curing ratio | A | A | B | A | D | D | D | D | D | D | D | D | D |
| | Curability change ratio after accelerated deterioration test | A | A | B | A | D | D | D | D | D | D | D | D | D |
| Evaluation of Liquid Sagging | | A | A | A | A | D | D | D | D | D | D | D | D | D |

In the above diamond particles of Examples, by cleaning them under specific conditions, the ionic conductivity Di could be made low and the amount of impurities having a chromium atom, an iron atom and the like could be made small. Hence, in the diamond-containing composition in each Example, the curing properties became good and liquid sagging and the like did not substantially occurred.

By contrast, in the diamond particles of Comparative Examples, since the predetermined cleaning was not carried out, the ionic conductivity Di could not be made low and impurities could not be removed sufficiently. Hence, in the diamond-containing composition in each Comparative Example, the curability was poor and liquid sagging also occurred.

The invention claimed is:
1. A diamond particle used for a diamond-containing composition comprising a polymer matrix, having an ionic conductivity Di of 0.05 mS/m to 0.8 mS/m represented by the following expression and an average particle diameter of 0.5 μm or larger and 250 μm or smaller:

$$Di = Ds - Dw$$

wherein Ds represents an ionic conductivity of an aqueous solution obtained by dissolving-out in a pressure cooker test carried out according to IEC68-2-66; and Dw represents an ionic conductivity of distilled water; and wherein the ionic conductivity Di is an index that indicates the amount of ionic impurities adhered on a surface of the diamond particle.

2. The diamond particle according to claim 1, comprising components originated from a metal catalyst.

3. The diamond particle according to claim 1, which is a crystallized diamond particle.

4. The diamond particle according to claim 1, which is synthesized by crystallizing in the presence of a metal catalyst in a high temperature and high pressure.

5. The diamond particle according to claim 1, having an average particle diameter of 1 μm or larger and 250 μm or smaller.

6. The diamond particle according to claim 1, having a sphericity of 0.5 or higher, wherein the sphericity is calculated by examining an electron microscope photograph and calculating a diameter of a circle whose area is equivalent to a projected area of the particle or a diameter of a smallest circle circumscribing a projected image of the particle, and the sphericity is an average value of sphericities of 300 particles, and in the case where the diamond particle does not have 300 particles, the sphericity is an average value of all the particles of the diamond particle.

7. A diamond particle used for a diamond-containing composition comprising a polymer matrix, having an ionic conductivity Di of 0.05 mS/m to 0.8 mS/m represented by the following expression and an average particle diameter of 0.5 μm or larger and 250 μm or smaller:

$$Di=Ds-Dw$$

wherein Ds represents an ionic conductivity of an aqueous solution obtained by dissolving-out in a pressure cooker test carried out according to IEC68-2-66; and Dw represents an ionic conductivity of distilled water; and wherein the ionic conductivity Di is an index that indicates the amount of ionic impurities adhered on a surface of the diamond particle, the diamond particle further comprising components originated from a metal catalyst and have sphericity of 0.5 or higher, wherein the sphericity is calculated by examining an electron microscope photograph and calculating a diameter of a circle whose area is equivalent to a projected area of the particle or a diameter of a smallest circle circumscribing a projected image of the particle, and the sphericity is an average value of sphericities of 300 particles, and in the case where the diamond particle does not have 300 particles, the sphericity is an average value of all the particles of the diamond particle.

* * * * *